March 6, 1928.   S. MOREL   1,661,492
TEASELING MACHINE
Filed Oct. 23, 1924   2 Sheets-Sheet 1
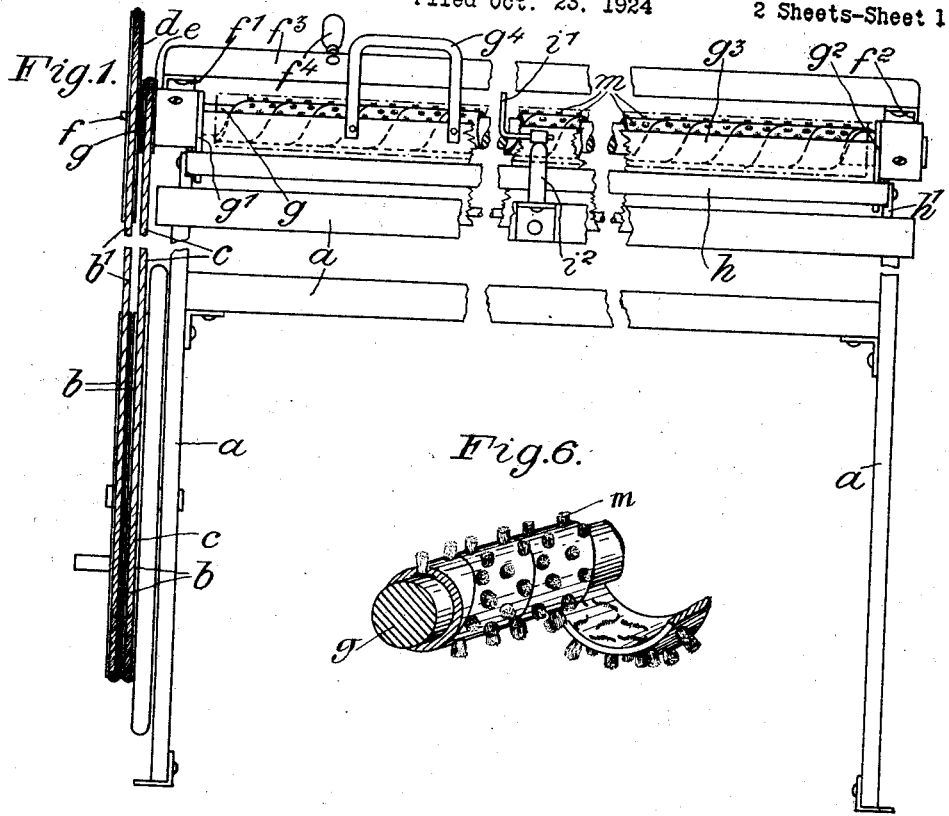
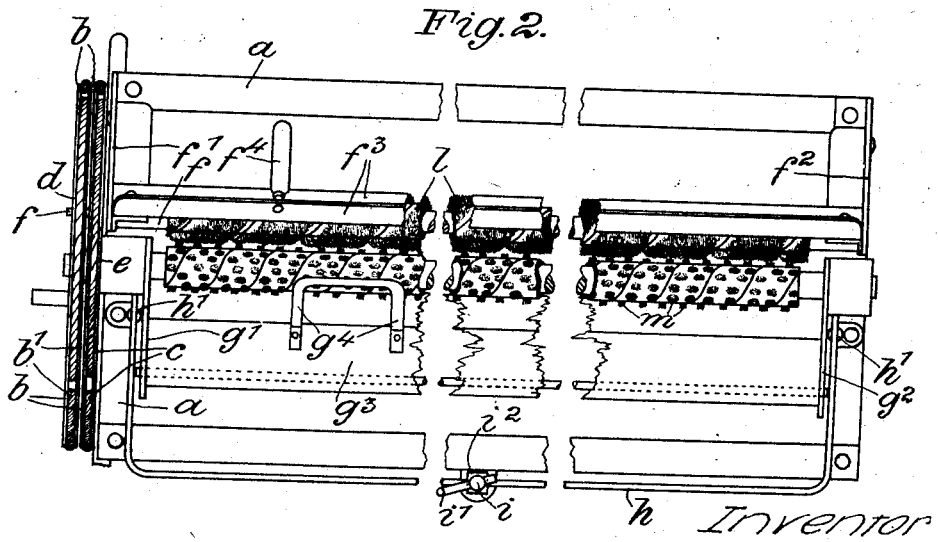
Inventor
S. Morel
by Langner Parry Card & Langner, Att'ys March 6, 1928.　　　　　　　　　　　　　　　　　　1,661,492
S. MOREL
TEASELING MACHINE
Filed Oct. 23. 1924　　　2 Sheets-Sheet 2
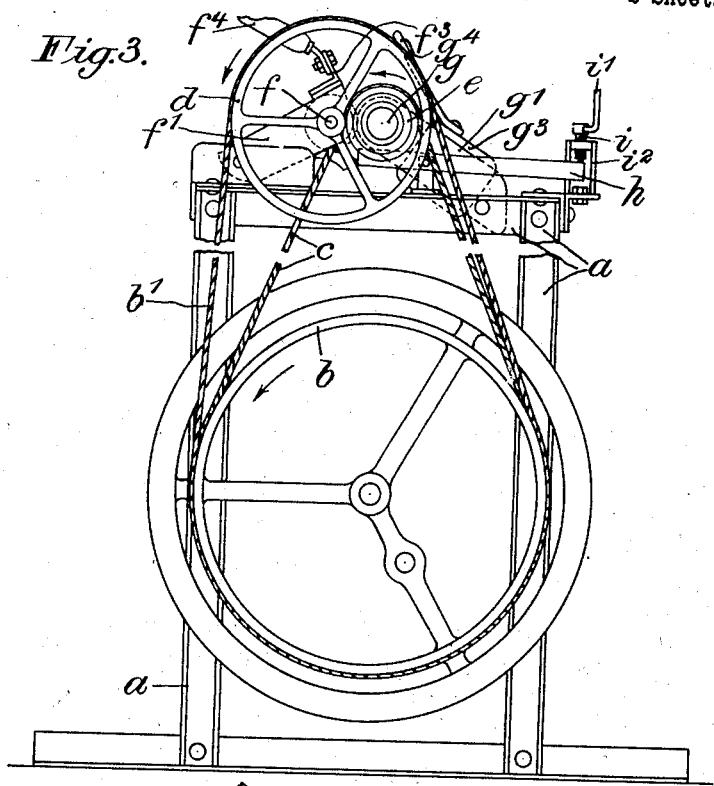
Fig. 3.
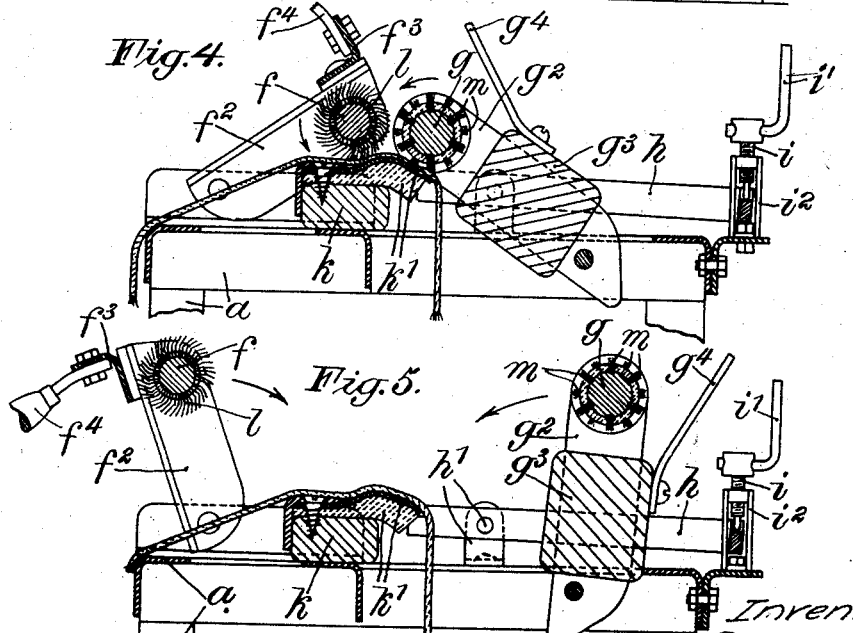
Fig. 4.
Fig. 5.
Inventor
S. Morel Patented Mar. 6, 1928.

1,661,492

UNITED STATES PATENT OFFICE.

STANISLAS MOREL, OF VEVEY, SWITZERLAND.

TEASELING MACHINE.

Application filed October 23, 1924, Serial No. 745,480, and in Switzerland October 31, 1923.

This invention relates to apparatus for teaseling all sorts of material or stuff which is adapted to be teaseled, for instance all sorts of fabrics, knittings and the like, for the purpose to produce a fluffy surface and to raise the nap of the cloth. The apparatus comprises at least two rotary members each provided with bristles, one of the rotary members being adapted to draw along, and for regulating the speed of the feeding of the material to be teaseled, and the other to effect the actual teaseling, the two rotary members being arranged parallel to one another and rotating in the same direction, but the one at a different speed from that of the other.

The attached drawing shows by way of example one working form of the apparatus according to this invention.

Figure 1 is a side elevation the central portion of which is broken away.

Figure 2 is a plan of the apparatus shown in Figure 1.

Figure 3 is an end elevation of the machine.

Figures 4 and 5 are sectional end elevations on a larger scale showing the upper portion of the machine in two different positions, and Figure 6 shows in perspective a portion of one of the rotary members according to this invention.

The apparatus illustrated comprises two end frames $a$ one of which carries a double grooved driving pulley $b$ adapted to rotate, by means of separate belts $b^1$ and $c$, pulleys $d$ and $e$ of different diameter respectively keyed to the ends of two rotatable spindles $f$ and $g$ extending across the machine.

The pulley $b$ may be driven by power from any suitable source, or by hand if desired.

The spindles $f$ and $g$ are respectively carried by arms $f^1$, $f^2$ and $g^1$ $g^2$ which can oscillate on the frame $a$ and thus be brought from their operative position shown in Figure 4 into their inoperative position shown in Figure 5. The arms $f^1$ and $f^2$ are connected by means of a link $f^3$ provided with a handle $f^4$ which enables both arms and the spindle they carry to be moved simultaneously. Similarly the arms $g^1$ $g^2$ are connected by means of a cross bar for example of wood $g^3$ provided with a handle $g^4$ by means of which these arms and the rotary member they carry can also be moved as shown in Figure 5.

A balance arm or beam $h$ mounted on the frame $a$ and comprising a member bent over at its ends so as to swing in brackets $h^1$ secured to the frame, is provided to raise the spindle $g$ for the purpose to be hereafter described. This balance member or bascule carries a regulating device comprising a screw $i$ having an operating handle $i^1$. The screw can be adjusted within an internally threaded member $i^2$ of which the lower end rests on the central portion of the bascule.

A cross bar $k$ (shown in section in Figures 4 and 5) is secured to the frame parallel to the spindles $f$ and $g$ and provided with a felt pad $k^1$ covered with a thick cloth. This pad is disposed below the spindles and serves a purpose to be explained later.

The spindle $f$ is provided with a felt covering $l$ or the like in which metal bristles are fastened so as to form a metal brush and the other spindle $g$ is also provided with bristles which may be of horsehair or the like. The film on the spindle $f$ is preferably formed from a band of thick cloth which is wound helically upon the spindle $f$ and secured at its ends in any convenient manner. The fabric carrying the bristles $m$ is preferably in the form of a continuous layer or belt wound spirally onto with edges abutting, and thus fastened to, the spindle $g$. Either the bristles $l$ or those $m$ can however be secured to their respective spindles in any other suitable manner.

The bristles or teeth of the metal brush $l$ are preferably bent as shown in Figures 4 and 5 in the opposite direction to that in which the spindle $f$ rotates to prevent them from catching in the fabric to be teaseled and thus injuring it. These teeth or bristles merely drive the fabric which is teaseled by coming into contact with the other bristles $m$.

The operation of the machine is as follows: The spindles $f$ and $g$ are brought by means of their respective handles $f^4$ and $g^4$ into the position shown in Figure 5 and the fabric to be teaseled is placed on the cross member $k$ as indicated in Figure 5. The spindles $f$ and $g$ are then moved into the operative position shown in Figure 4 so that the bristles $l$ and $m$ rest on the fabric to be teaseled. The driving pulley $b$ is then rotated in the direction of the arrow shown in Figure 3 and by means of the belts $b^1$ and $c$ the driving pulley rotates the driven pulleys $d$ and $e$ respectively secured to the spindles $f$ and $g$ and owing to the different diameters of these pulleys the spindles rotate at different speeds, the spindle $f$ being driven at a less speed than the spindle $g$. Rotation of the spindle $f$ drives, by means of the bristles $l$ which it carries, the fabric to be teaseled, the spindle $g$ by means of its bristles $m$ simultaneously brushing the fabric and thus raising its nap or fibres to produce the required surface. As the spindle $g$ rotates more quickly than the spindle $f$ the tufts of bristles frequently come into contact with the same length of fabric before this fabric is driven forward by the bristles $l$ so that the nap is not only raised but also brushed in the desired direction.

According to the extent to which the teaseling is to be effected the distance between the spindle $g$ and the supporting pad carried by the cross member $k$ is regulated by means of the member $h$ and its adjusting screw $i$ so that the tufts of horsehair or like bristles shall press to a greater or less extent against the fabric. As the covering of the cross member $k$ is made of some resilient material it can adapt itself to the shape of the roller formed by the spindle $g$ and its bristles, the thick covering which the cross member carries preventing the felt pad $k^1$ from being damaged. Thus the degree or extent of teaseling passing through the machine can readily be adjusted and as the teaseling roller as a whole can be instantly raised by operating the handle $g^1$, any selected portion of the fabric can be left unteaseled, whereas other lengths are teaseled, an arrangement which is of considerable value in certain classes of work.

The bristles or teeth of the metal brush or the bristles of the teaseling roller might be otherwise mounted than according to Figure 6.

What I claim is:

1. A machine for teaseling all kinds of material adapted to be teaseled comprising, in combination a non-rotatable support for carrying the material to be teaseled, a revoluble feeding member arranged to rest upon said support by gravity, and a revoluble brushing device cooperating with said support, and means for driving the brushing device and the feeding member.

2. A machine for teaseling all kinds of material adapted to be teaseled comprising, in combination, a non-rotatable support for carrying the material to be teaseled, a revoluble feeding member arranged to rest upon said support by gravity, and a revoluble brushing device cooperating with said support, and means for driving said brushing device and feed member at different speeds.

3. A machine for teaseling all kinds of material adapted to be teaseled comprising, in combination, a non-rotatable yieldable support for carrying the material to be teaseled, a revoluble feeding member arranged to rest upon said yieldable support by gravity, and a revoluble brushing device cooperating with said yieldable support, and means for driving said brushing device and feed member, at different speeds.

In testimony whereof I have affixed my signature.

STANISLAS MOREL.